United States Patent [19]

Uehara

[11] Patent Number: 4,586,103
[45] Date of Patent: Apr. 29, 1986

[54] ELECTROMAGNETIC CONTROL DEVICE FOR TAPE RECORDER

[76] Inventor: Zenshiro Uehara, 21-19, Hiyoshicho 4, Kokubunji-shi, Tokyo, Japan

[21] Appl. No.: 449,224

[22] Filed: Dec. 13, 1982

[30] Foreign Application Priority Data

Dec. 11, 1981 [JP] Japan .................. 56-199550

[51] Int. Cl.⁴ .............................................. G11B 15/00
[52] U.S. Cl. ..................................... 360/137; 360/90
[58] Field of Search .......... 360/137, 90, 93, 96.1–96.6, 360/69

[56] References Cited

U.S. PATENT DOCUMENTS

| | | | |
|---|---|---|---|
| 4,184,185 | 1/1980 | Yakame | 360/137 |
| 4,370,686 | 1/1983 | Katoh et al. | 360/96.3 |
| 4,491,887 | 1/1985 | Sato | 360/137 X |

Primary Examiner—John H. Wolff
Attorney, Agent, or Firm—Fidelman, Wolffe & Waldron

[57] ABSTRACT

A movable element is attracted and displaced by an electromagnet against the resilience of a return spring to change a tape recorder from stoppage state into operation state. When the element is returned to its original position by the magnet, it moves so as to change the tape recorder from stoppage state into operation state. The return spring is so selected as to exert a force stonger than the attractive force, which acts on the movable element by the residual magnetism of the electromagnet, whereby the return of the element is achieved with certainty.

In a case where a tape recorder is supplied with electric power from commercial power, when the supply of such power is cut off due to an accident, such as power failure, while the tape recorder is in use, a combination of a cam and a spring enables automatic restoration of the tape recorder to stoppage state.

5 Claims, 8 Drawing Figures

ELECTROMAGNETIC CONTROL DEVICE FOR TAPE RECORDER

FIELD OF THE INVENTION

The present invention relates to an electromagnetic control device for tape recorder and, more particularly, to such a device for switching operation modes, such as record, playback, rewind and rapid advance, of a tape recorder.

BACKGROUND OF THE INVENTION

In the prior art practice, when a tape recorder of a cassette type or open reel type is to be constructed for automation of a record, playback, stop, rewind or other operation, an electromagnetic plunger is used as a drive source to permit a "feather-touch" operation or a remote control. When a record/playback mode of the tape recorder is to be established, it is necessary to slide a head mount on which various heads, pinch roller and the like are mounted, to a record/playback position against the action of a return spring or the like and to urge the pinch roller against the capstan with a force of a magnitude which is usually on the order of 1 to 2 Kg. While the magnitude of the force varies with the variety and the size of the tape recorders, a required minimum value for apparatus of a reduced size will be on the order of 1 Kg. The electromagnetic plunger which is used to produce such force will be oversized as compared with that of the heads, occupying a greater proportion of the space on the chassis. In addition, the power dissipation is increased, which is disadvantageous from the standpoint of minimizing the overall power consumption. In addition, the use of the electromagnetic plunger causes impacts and noises when it is energized, further contributing to the generation of heat. The situation is not limited to the operation of the plunger which is used to establish a record/playback mode, but the same applies to the operation of another electromagnetic plunger which is used to establish a rewind or rapid advance mode.

In an attempt to eliminate the disadvantage from the tape recorder using such an electromagnetic plunger, a construction utilizing a combination of an electromagnet and a spring has been proposed. In particular, the magnetic attraction of the electromagnet displaces an armature against the biasing force of a return spring to change the operation mode of the tape recorder. That is, this construction utilizes a portion of the force of a drive motor which is the driving source of the tape recorder to change it into a selected operation mode. However, the control device incorporating the combination of the electromagnet and the spring has problems as follows.

First, the electromagnet must be able to displace the armature against the biasing force of the return spring by its attraction, and therefore a large-sized electromagnet is necessarily required. Secondly, the return spring must exert a force sufficient to withdraw such armature that is attracted to the magnet due to residual magnetism from the magnet and to restore it to its original position with certainty, thus a strong spring is also needed. This prior art construction was merely able to prevent generation of noise when mode changeover operation is effected, and almost no contributions have been made by it to miniaturization of the device, prevention of heat generation and decrease in power consumed.

In addition, in case of a tape recorder which is supplied with electrical power from commercial power, when the supply of power ceases as by electrical power failure while the tape recorder is in use, drive motor, that is driving source of the tape recorder, itself stops. Consequently, the tape recorder as well as a tape installed in it stops without being set in position, and this mechanically undesirable state is maintained.

SUMMARY OF THE INVENTION

In view of these considerations, it is an object of the present invention to provide a tape recorder which consumes a minimum quantity of electrical power when changeover operations are effected and which can use a smaller electromagnet and a smaller return spring that exerts a small force, whereby the control device of the tape recorder is miniaturized. Further, the tape recorder can automatically return to its stoppage state when supply of electrical power is cut off.

It is another object of the present invention to provide a small-sized control device for tape recorder which consumes less electrical power and assures reliable changeover operations.

It is a further object of the present invention to provide a tape recorder which is automatically put into stoppage state when an unintended stoppage of supply of electrical power occurs, whereby deterioration of the functions of the tape recorder is prevented.

In one aspect of the invention, a movable element which is attracted and displaced by an electromagnet and acts to change the tape recorder into a selected operation mode is provided with a return spring whose force is increased by the displacement of the movable element.

In another aspect of the invention, a cam and a spring which urges a cam follower into abutting contact with the surface of the cam are so arranged that when the tape recorder is in a state of operation, the pressure which is applied to the cam by the urging spring via the cam follower is exerted in such a direction that rotates the cam from its operation state to its stoppage state, and at this time the cam is subjected to only the force from the urging spring.

DETAILED DESCRIPTION OF THE INVENTION

Figure 2:
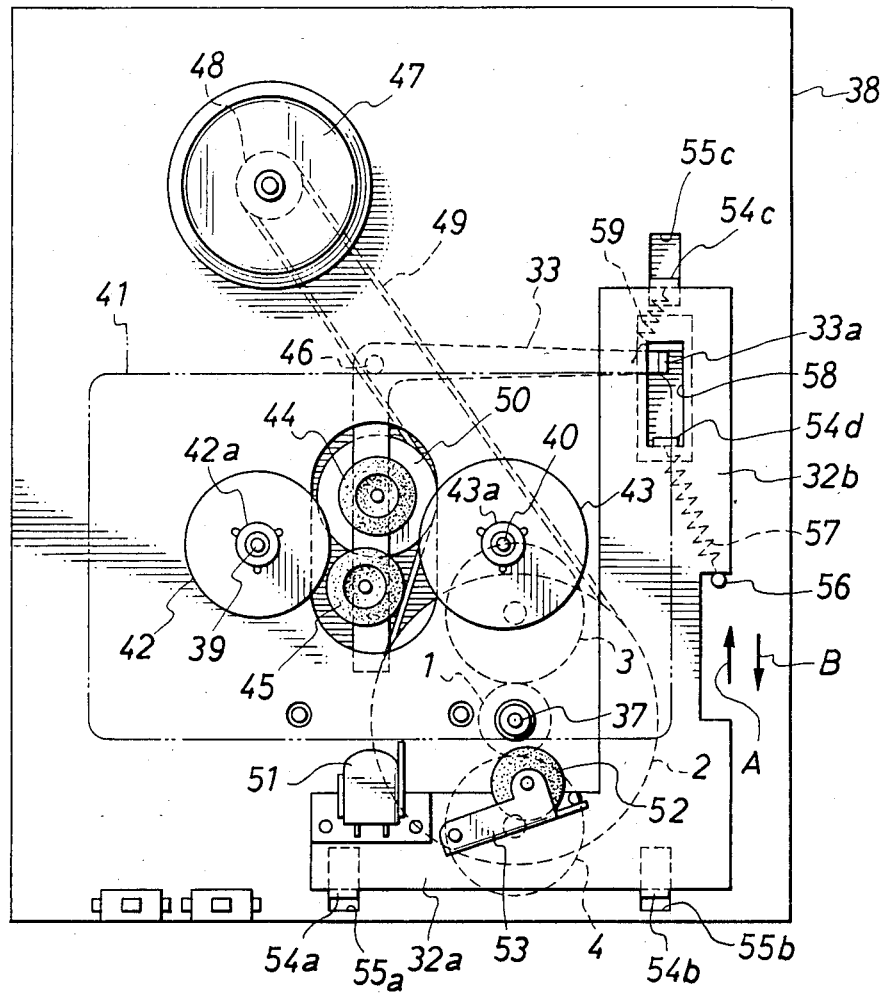
FIG. 2 is a schematic plan view of the principal portions of a tape recorder according to the invention.
Figure 3:
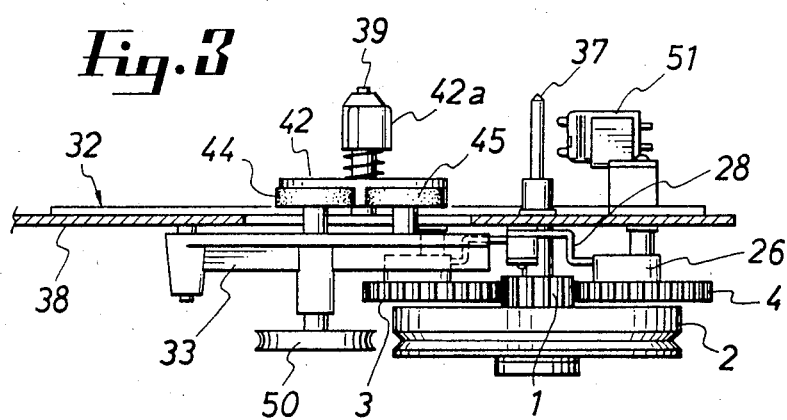
FIG. 3 is a fragmentary side elevation of a tape recorder according to the present invention.

FIG. 2 is a plan view of a tape recorder incorporating a device according to the invention. Indicated by reference numeral 38 is a chassis, and shafts 39 and 40 are securely fixed to the surface of the chassis 38 in perpendicular relation thereto. The shafts 39 and 40 are spaced apart a distance corresponding to the on-center spacing between a pair of reel hubs on which a cassette tape 41 is disposed. A feed reel mount 42 is rotatably mounted on the shaft 39, while a take-up reel mount 43 is rotatably mounted on the shaft 40. The reel mounts 42 and 43 are integrally formed with concentric shanks 42a and 43a, respectively, which are engaged by the respective reel hubs of the cassette tape 41.

A first idler 44 is disposed between the reel mounts 42 and 43 for engagement with and disengagement from the outer periphery of the reel mount 43. The idler 44 is rotatably mounted on one end of an idler lever 33 which is in turn pivotally mounted on the underside of the chassis 38 by means of a pin 46. A second idler 45 is rotatably mounted on the same end of the lever 33 for engagement with and disengagement from the outer periphery of the first idler 44 as well as the outer periphery of the reel mount 42.

A capstan 37 extends upright through the chassis 38 and is rotatably mounted by means of a bearing. Fixedly mounted on the portion of the capstan which extends below the chassis 38 is a flywheel 2, which serves to stabilize the rotation of the capstan 37 by absorbing small speed fluctuations caused by a non-uniform rotation of a motor and a transmission mechanism. The lower end of the capstan 37 is supported by a bracket, which is mounted on the underside of the chassis 38, in order to prevent the capstan from being withdrawn from the aforesaid bearing. A drive motor 47 is mounted on the chassis 38 and has its shaft extending below the chassis and fixedly carrying a drive pulley 48. A belt 49 extends around the pulley 48 and the flywheel 2, thus transmitting the rotation of the motor 47 to the capstan 37. Intermediate between the pulley 48 and the flywheel 2, the belt also extends around a pulley 50 which is integrally mounted on the shaft on which the first idler 44 is mounted, thus also transmitting the rotation of the motor 47 to the first idler 44.

A head mounting baseplate 32 is disposed on top of the chassis 38 and is movable in directions indicated by arrows A and B. As will be noted from FIG. 2, the baseplate 32 has an inverted L-shaped configuration and includes a front arm 32a on which a record/playback head 51 is mounted by using a head mount and on which a pinch roller 52 made of rubber is also mounted by using a support 53 in a manner to permit its cooperation with the capstan 37. The front edge of the arm 32a is formed with a pair of spaced claws 54a and 54b which are engaged with elongate slots 55a and 55b formed in the chassis 38. Similarly, a claw 54c is formed on the rear edge of a lateral arm 32b of the baseplate 32, and engages a similar elongate slot 55c formed in the chassis. In this manner, the entire baseplate 32 is slidable in directions indicated by arrows A and B. A stop 56 is provided on the chassis 38 to limit the extent of movement of the baseplate 32 in the direction of arrow B, and a tension spring 57 extends between the stop 56 and a claw 54d formed on the base-plate 32 beneath the chassis to urge the baseplate 32 in the direction of arrow B for automatic return of the head assembly to its reset position. The other end 33a of the lever 33 which is remote from the idlers 44 and 45 is engaged with a slot 58 formed in the lateral arm 32b so that the lever 33 can be turned either forwardly or reversely around the pin 46 as the baseplate 32 moves in the directions of arrows A and B, thereby moving the first idler 44 into engagement with or disengagement from the outer periphery of the take-up reel mount 43. Another tension spring 59 extends between the end 33a of the lever 33 and the claw 54c of the baseplate 32.

Figure 1:
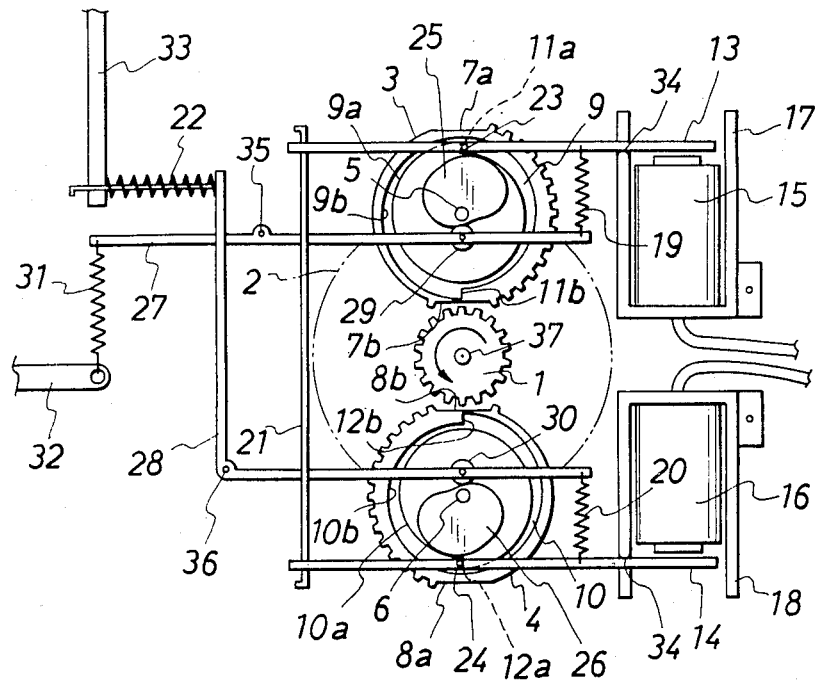
FIG. 1 is a plan view of one example of electromagnetic control device of a tape recorder embodying the concepts of the invention.

FIG. 1 is a plan view of an electromagnetic control device according to the invention, and in this figure the aforementioned chassis 38 and head baseplate 32 are omitted for simplicity. The device comprises a gear 1 which is concentrically secured to the flywheel 2 used with the capstan 37, and a toothed wheel 3 with hiatus and another toothed wheel 4 with hiatus, both of which are disposed for meshing engagement with gear 1.

The hiatus wheels 3 and 4 are rotatably mounted on shafts 5 and 6, respectively, which are mounted on the underside of the chassis and extending at right angles thereto. The hiatus wheel 3 is peripherally formed with a pair of hiatuses 7a and 7b which are spaced apart 180° along the circumference thereof as shown in FIG. 1. One of the peripheral portions, which extend between the hiatuses 7a and 7b, is formed with teeth, while the other is formed with no teeth. The hiatus wheel 4 is also peripherally formed with a pair of hiatuses 8a and 8b which are again displaced from each other by 180°. The hiatus wheels 3 and 4 are disposed symmetrically with respect to the central axis of the gear 1.

In the surface facing the chassis, the hiatus wheels 3 and 4 are formed with substantially concentric, continuous grooves 9 and 10, respectively. A pair of locking steps 11a and 11b are formed on the inner and the outer wall surface 9a and 9b, respectively, of the groove 9 and are displaced 180° from each other. Similarly, a pair of steps 12a and 12b are formed in the inner and the outer wall surfaces 10a and 10b, respectively. The inner and outer wall surfaces of the respective grooves 9 and 10 are in the form of an involute starting from the associated step.

A pair of movable elements 13 and 14 are associated with the hiatus wheels 3 and 4, respectively, and are disposed tangentially of the grooves 9 and 10 of the associated wheels 3 and 4. The element 13 is non-detachably attached to a frame 17 of an electromagnet 15, which is securely fixed to the chassis 38, such that the element 13 is tiltable with respect to the frame 17.

Figure 6:
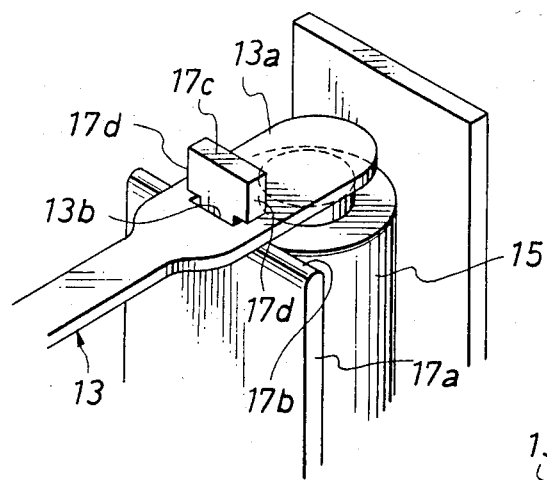
FIG. 6 is a partially enlarged perspective view of one example of construction by which the movable element is brought into engagement with the frame of an electromagnet.
Figure 7:
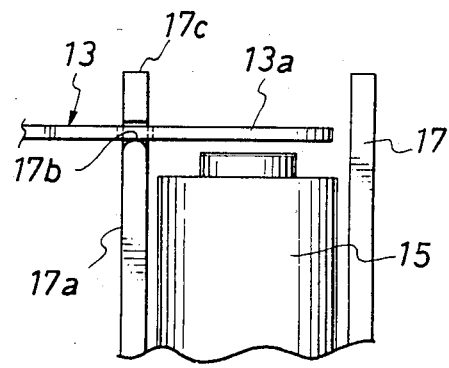
FIG. 7 is a side elevation of the construction shown in FIG. 6.

Referring to FIGS. 6 and 7, an example of attachment of the movable element 13 to the frame 17 is shown. The element 13 has a head piece 13a which is in opposition to the attaching surface of the electromagnet 15, and the base end portion of the head piece is provided with a hole 13b. The upper end of one side plate 17a of the frame 17 is centrally provided with a protruding attachment piece 17c which is adapted to be inserted into the hole 13b. On opposite sides of the front edge portion protruding above the hole 13b, protruding stops 17d are provided in order to prevent the movable element 13 from disengaging from the frame 17. The upper fringe of the side plate 17a with which the element 13 is brought into abutting engagement when it is inserted into the hole is provided by a supporting fringe 17b shaped into an arc, and this fringe smooths the tilting operation of the element 13.

On the opposite side of the head piece 13a with respect to the spot of the supporting fringe 17b with which the element 13 abuts, one end of a return spring 19 is anchored in position. The force of the spring acts in such a direction that the head piece 13a attached to the magnet 15 by its attractive force moves away from the magnet 15.

Figure 5:
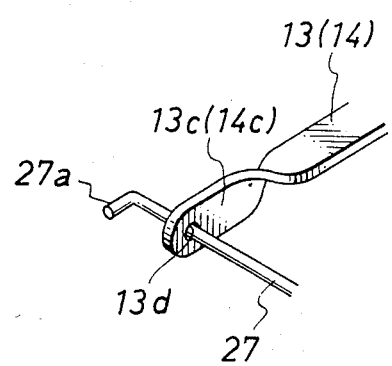
FIG. 5 is a partially enlarged perspective view showing the movable element and a portion of a plate body with which the movable element is brought into engagement.

Similarly, the movable element 14 is held to the electromagnet 16, and one end of the withdrawing spring 20 is anchored to the element 14. On opposite side of the head pieces of the elements 13 and 14, a connecting end 13c has a through-hole 13d, as shown in FIG. 5. A connecting rod 21 having a pair of ends 21a (FIG. 5) which are bent for preventing disengagement from the through-hole 13d after the rod has been inserted into the through-hole. Thus, it is impossible for the elements 13 and 14 to move in opposite directions. This is for the purpose of preventing the elements 13 and 14 from simultaneously assuming the same operation state.

Figure 4:
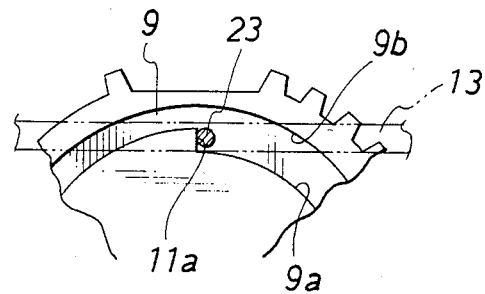
FIG. 4 is a partially enlarged plan view showing the mating engagement of the protrusion of a movable element with the step of a toothed wheel with hiatus.

Further, the movable elements 13 and 14 are provided with protrusions 23 (see FIG. 4) and 24, respectively, and held therein. When the elements 13 and 14 are attracted by their respective magnets 15 and 16, the protrusions 23 and 24 are urged into abutting engagement with the outer wall surfaces 9b and 10b, whereby the elements 13 and 14 are allowed to engage the steps 11b and 12b, respectively. On the other hand, when the electromagnets 15 and 16 are deenergized, the return springs 19 and 20 urge the elements into abutting engagement with the inner wall surfaces 9a and 10a, respectively. As a result, the protrusions 11b and 12b are allowed to engage the steps 23 and 24, respectively.

Integrally secured to the surface of the hiatus wheels 3 and 4 in which the grooves are formed are, a pair of plate cams 25 and 26. Cam followers 29 and 30 are caused to bear against the cam surfaces of the cams 25 and 26, respectively, and elements 27 and 28 are mounted on the chassis 38 by means of shafts 35 and 36, respectively, so that they are tiltable.

Secured to one end of the tiltable element 27 is the other end of the return spring 19, and the other end of the element 27 is linked to the head baseplate 32 via the spring 31. The springs are so selected that the spring 31 exerts a force greater than that exerted by the spring 57, which acts to withdraw the head baseplate, and therefore the spring 31 causes the cam follower 29 to bear against the cam surface of the plate cam 25, and at this time if the cam 25 is rotated, then the magnetic head assembly is allowed to perform its recording/playback operation or its release operation.

The other end of the return spring 20 is secured to one end of the tiltable element 28, and the other end of the element 28 is linked to one end of the idler lever 33 via the spring 22. The spring 22 urges the cam follower 30 to bear against the plate cam 26, and in this state when the cam 26 is rotated the mechanism of the tape recorder is caused to effect a tape rewind operation and its release operation. The spring 22 has the same purpose and function as the return spring 59 shown in FIG. 2. Actually, either the spring 22 or 59 may be used.

The plate cams 25 and 26 are so shaped as to resemble a soy bean when viewed from the above, as shown in FIG. 1, and secured to the hiatus wheels 3 and 4, respectively, with a large eccentricity from the center axes of the wheels 3 and 4. While the protrusions 23 and 24 engage their respective steps 11a and 12a, that is, while hiatuses 7b and 8b are in opposition to the gear 1, the cam followers 29 and 30 bear against their respective cam surfaces at positions that are taken immediately before the cam surfaces of the plates 25 and 26 come closest to their respective shafts 5 and 6. Then, it is assumed that the cams 25 and 26 have rotated integrally with the hiatus wheels 3 and 4 through an angle of 180°. After rotating 180° from the position of FIG. 1, the protrusions 23 and 24 engage the steps 11b and 12b, respectively, and the cam followers 29 and 30 bear against the respective cam surfaces at positions in which they have slightly moved past the remotest positions from the shafts 5 and 6, respectively.

That is, the cams 25 and 26 are secured to their respective hiatus wheels 3 and 4 such that their cam surface portions receding gradually from the shafts 5 and 6 are opposed to the substantially semicircular, toothed peripheral portions of the wheels 3 and 4, and that the cam surface portions approaching gradually toward the shafts 5 and 6 are opposed to the substantially semicircular, toothless peripheral portions of the wheels 3 and 4.

The operation of the device as described hereinbefore will be described below. Initially, it is assumed that a record/playback mode of the tape recorder is to be established under the conditions that the tape hubs carrying the cassette tape 41 are mounted on the reel mounts 42 and 43 and the motor 47 is set in motion. When the head assembly including the head 51, pinch roller 52 and baseplate 32 assumes a non-play position as shown in FIG. 1, the protrusion 23 on the movable element 13 is engaged with the inner step 11a formed in the groove 9 under the resilience of the spring 19 to thereby lock the hiatus wheel 3 (see FIG. 4) with its hiatus 7b located opposite to the gear 1. In this state, the cam follower 29 bears against the cam surface of the cam 25 at a position which lies in front of the position closest to the shaft 5.

When a switch is turned on under this condition as shown in FIG. 1, the electromagnet 15 is energized to attract the head piece 13a of the movable element 13 against the resilience of the return spring 19. This causes an angular displacement, which disengages the protrusion 23 on the element 13 from the step 11a and brings it into engagement with the outer wall surface 9b. Simultaneously, the hiatus wheel 3 is unlocked, and the depressing force of the spring via the tiltable element 27 as well as the pressure exerted by the cam follower 29 which bears against the cam surface at the position which is taken immediately before the cam 25 comes closest to the shaft causes the plate cam 25 and the hiatus wheel 3 to be slightly rotated in a clockwise direction as viewed in FIG. 1.

This rotation brings the gear 1, which is being rotated by the motor 47, into meshing engagement with the toothed portion of the wheel 3. Thereupon the rotation of the gear 1 is transmitted to the wheel 3, which is therefore rotated until a 180° angular displacement is completed and the hiatus 7a comes into opposition to the gear 1.

This rotation of the wheels 3 causes the tiltable element 27, which bears against the cam surface of the cam 25 rotated with the wheel 3, to rotate its one end connected with the return spring 19 in the direction indicated by the arrow in FIG. 1 in conformity with the contour of the cam surface of the cam 25 thus to increase the tension on the spring 19. As a result, head baseplate 32 is moved in the direction indicated by arrow A, whereby the head 51 is moved to bear against the magnetic tape. Hence, recording/playback mode can be established.

When the wheel 3 has been rotated through 180° from the position shown in FIG. 1, the hiatus 7a comes into opposition to the gear 1, whereupon the transmission of the rotation from the gear 1 to the wheel ceases. At the same time, the protrusion 23 engaging the outer wall surface 9b comes into engagement with the step 11b to stop the rotation of the wheel 3 maintaining the recording/playback mode. At this time, the cam follower 29 bears against the cam surface of the cam 25 at a position in which it has slightly moved apart the position remotest from the shaft 5.

When the electromagnet 15 is deenergized to release the recording/playback mode, the resilience of the spring 19 rotates the movable element 13. The result is that the head piece 13a of the element tilts, thus rapidly moving away from the magnet. Therefore, the protrusion 23 is disengaged from the step 11b, thereby the wheel 3 is unlocked.

After the release of the wheel 3 from the element 13, the wheel 3 should be made rotatable. However, as described previously, immediately after the protrusion 23 is disengaged from the step 11b, the cam follower 29 still bears against the cam 25 at a position in which it has moved past the position remotest from the shaft 5. This abutment of the cam follower 29 rotates the plate cam 25 and the wheel 3 in a clockwise direction. Thus, the wheel 3 is returned to the position shown in FIG. 1. Hence, the head baseplate 32 is released from its recording/playback mode. The rewind mechanism of the tape recorder including the hiatus wheel 4, movable element 14 and tiltable element 28 is driven by the electromagnet 16 and functions in exactly the same manner as the foregoing mechanism. Therefore, detailed description of the rewind mechanism is omitted herein.

Figure 8:
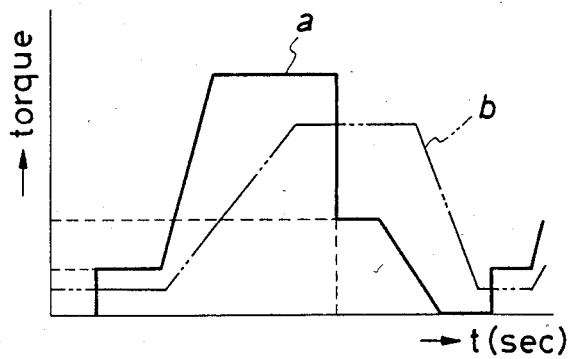
FIG. 8 is a diagram showing the relation between the magnetic attraction of the electromagnet acting on the movable element and the force of a return spring for the understanding of the operation of the device according to the invention.

As will be understood from the description above, when the movable element 13 is attracted by the magnet 15, the tension of the return spring 19 is increased by the action of the drive mechanism which comprises the wheel 3, plate cam 25, tiltable element 27, cam follower 29 and spring 31. Specifically, as indicated by curve a in FIG. 8, the magnetic force attracting the element 13 is generated when the electromagnet 15 is energized, and this attraction assumes its maximum value when the element 13 is attached to the magnetic core of the magnet 15. Under this condition, when the electromagnet 15 is deenergized, the force attracting the element 13 weakens rapidly, but a relatively large attraction caused by the residual magnetism on the magnetic core acts on the element during a short period of time.

The resilience of the return spring 19 is so set as to describe curve b in FIG. 2. In particular, in the state shown in FIG. 1, the energized magnet 15 exerts a weaker force on the element 13 than the magnetic attraction. When the drive mechanism is energized, the plate cam 25 causes one end of the tiltable piece 27 to be displaced in the arrow direction, thereby the other end of the spring 19 is moved apart from the element 13, whereupon the resilience of the spring exerts a much greater force on the element 13 than the residual magnetism of the magnet 15.

Thus, when the electromagnet 15 is energized and the element 13 is attracted toward it, the resilience of the spring is sufficiently smaller than the magnetic attraction acting on the element. Consequently, the attracting operation of the magnet 15 is rapidly performed with certainty. Meanwhile, after the magnet 15 is deenergized, the resilience of the spring is sufficiently greater than the attraction caused by the residual magnetism during a short period of time, thus the element 13 that has been attached to the magnet 15 by virtue of the operation of the drive mechanism can be disengaged therefrom rapidly with certainty. This means that the resilience of the spring 19 in the condition shown in FIG. 1 can be made quite small. Hence, the magnet 15 can be sufficiently miniaturized and such a small-sized magnet requires a less quantity of electrical power to be energized.

Since the hiatus wheels 3 and 4 are provided with no teeth on their substantially semicircular peripheral portions 7a, 7b and 8a, 8b, the return of the wheels 3 and 4 from an operation position, such as recording/playback position or rewind position, to stoppage position can be performed only by the resilience of the spring 31, 22, 57 or 59.

Accordingly, if supply of electrical power to the tape recorder is cut off while it is in a state of recording or playback because of electrical power failure, for example, then the magnet 15 is deenergized, which disengages the protrusion 23 of the element 13 from the step 11b of the wheel 3, thus unlocking the wheel 3. Then, resilience of the spring 31 and/or the spring 57 causes the wheel 3 to bring its hiatus 7b into opposition to the gear 1. In this way, this non-operation condition can be automatically set and maintained. The automatic restoration to non-operation condition also applies to the wheel 4 in exactly the same manner.

In this way, when the protrustions 23 and 24 are disengaged from the steps 11b and 12b, respectively, the hiatus wheels 3 and 4 automatically return to their non-operation condition owing to their substantially semicircular toothless peripheral portions. Hence, in a situation where an external accident, such as electrical power failure, occurs, the wheels are able to automatically restore the tape recorder to its non-operation condition, whereby deterioration in functions of the magnetic tape in the cassette 41, recording/playback head 51, pinch roller 52 and the like is effectively prevented.

Further, the connecting ends 13c and 14c of the respective movable elements 13 and 14 are connected together by means of the connecting rod 21, and the interval between the connecting ends 13c and 14c are so limited that it does not become larger than the interval which is obtained when only one of the elements 13 and 14 is put in operation. As such, should an accident which energizes both electromagnets 15 and 16 occur for one cause or another, the tape recorder is assured that no incorrect operation will take place therewithin.

It is to be understood from the foregoing description that in accordance with the present invention, sufficiently small-sized electromagnets can be used, whereby electrical power expended by such magnets is low. Also, the operation in which the electromagnets attract the movable elements as well as the operation in which the elements move away from the electromagnets can be performed rapidly with certainty. Further, the variation curve of the resilience of the return spring can be arbitrarily and easily set. Furthermore, only the depressing force is needed to restore the hiatus wheels from its operation condition to its non-operation condition, because each wheel has a substantially semicircular, toothless peripheral portion and such depressing force acts on each hiatus sheel via the cam follower.

Thus, in case where the supply of electrical power is unexpectedly cut off due to power failure, for example, the tape recorder can be automatically restored to its non-operation mode with certainty, whereby deterioration of delicate magnetic tape, recording/playback head and pinch roller can be prevented. In addition, since both movable elements cannot be attached to the electromagnets simultaneously, the tape recorder is assured that it is by no means caused to perform conflicting operations simultaneously, whereby stable operation of the tape recorder is obtainned and, at the same time, safe operation is achieved.

What is claimed is:

1. An electromagnetic control device a for tape recorder, and comprising:
   a chassis,
   a capstan rotatably mounted on the chassis,
   a flywheel mounted on the capstan in coaxial relation with said capstan,
   a first toothed wheel mounted on the capstan in coaxial relation therewith,
   a second toothed wheel which has a pair of hiatuses and is rotatably mounted on the chassis for meshing engagement with the first wheel,
   a plate cam mounted integrally with the second wheel,
   a tiltable element which is mounted on the chassis such that it tilts with the rotation of the plate cam and which derives a force necessary for change-over operation of the tape recorder from angular displacement of said tiltable element,
   a movable element which is mounted such that it is tiltable for locking engagement with and disengagement from the second wheel, the movable element locking the second wheel against rotation when any one hiatus of the second wheel is opposed to the first wheel,
   an electromagnet exerting a magnetic attraction on the movable element for tilting same, and
   a return spring having one end fixed on a side opposite to the side on which said force derived by the tiltable element is available,
   wherein the second wheel is provided with teeth only one peripheral portion between the hiatuses, and wherein the return spring is fixed to the movable element at a point which is generally symmetrical with respect to a core of said electromagnet about a pivot axis of the movable element.

2. An electromagnetic control device wherein a cam drive mechanism is unlocked in response to attraction of a moveable element by an electromagnet for angularly moving a tiltable element to effect a desired operation, characterized by:
   a release spring connected between the movable element and the tiltable element which are disposed in confronting relation;
   means for supporting said release element in a substantially floating condition before said moveable element is attracted to said electromagnet for saving power of the electromagnet upon attraction;
   means for displacing said tiltable element in response to angular movement of a cam of said cam drive mechanism to effect the desired operation and for simultaneously tensioning said release spring sufficiently after said movable element has been attracted to said electromagnet; and
   means for returning said moveable element to an original position under the tension of said release spring when said electromagnet is deenergized while overcoming an attractive force due to residual magnetism of said electromagnet.

3. In a machine control having an electromagnet for attracting a moveable element toward a core by a magnetic force upon energization thereof in order to effect an operating state of said machine, and a spring means for overcoming a magnetic residual force and moving said element away from said core upon deenergization of said electromagnet means to ensure a non-operating state of said machine, the improvement comprising:
   means for minimizing said magnetic force needed to attract said moveable element by providing said spring means with a first spring force less than said residual force during said attracting and, after said element is attracted to said core, providing said spring means with a second spring force sufficient to overcome said residual force upon deenergizing of said electromagnet.

4. An improvement as in claim 3, wherein said minimizing means further coimprises:
   cam means for controlling extension and retraction of at least one spring of said spring means according to said machine being respectively in said operating and nonoperating states to provide said second and first spring forces.

5. An improvement as in claim 3, and further comprising:
   another said electromagnet and another said minimizing means; and
   means for preventing effecting of an operating state by said electromagnet and said minimizing means simultaneously with an operating state by said other electromagnet and said other minimizing means.

* * * * *